United States Patent
Wang et al.

(10) Patent No.: US 11,258,892 B2
(45) Date of Patent: Feb. 22, 2022

(54) COMMUNICATION SIGNAL TRANSFORM DEVICE AND COMMUNICATION SIGNAL TRANSFORM METHOD

(71) Applicants: Li-Chuan Wang, Taipei (TW);
Che-Wei Liang, Taipei (TW);
Kun-Hsuan Chang, Taipei (TW);
Sheng-Chieh Tang, Taipei (TW);
Jung-Ming Hung, Taipei (TW)

(72) Inventors: Li-Chuan Wang, Taipei (TW);
Che-Wei Liang, Taipei (TW);
Kun-Hsuan Chang, Taipei (TW);
Sheng-Chieh Tang, Taipei (TW);
Jung-Ming Hung, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/417,662

(22) Filed: May 21, 2019

(65) Prior Publication Data
US 2019/0373097 A1    Dec. 5, 2019

Related U.S. Application Data

(60) Provisional application No. 62/674,569, filed on May 21, 2018.

(51) Int. Cl.
*H04M 1/725*    (2021.01)
*H04M 1/02*    (2006.01)
(Continued)

(52) U.S. Cl.
CPC ...... *H04M 1/72409* (2021.01); *G06F 1/1626* (2013.01); *G06F 1/1632* (2013.01); *H04M 1/0283* (2013.01)

(58) Field of Classification Search
CPC ..... H04M 2203/1091; H04M 3/42229; H04M 3/42263; H04M 3/54; H04M 7/0069;
(Continued)

(56) References Cited

U.S. PATENT DOCUMENTS 9,167,097 B2 * 10/2015 Kung ................. H04L 65/1026
9,276,628 B1 * 3/2016 Zommer ............. H04B 1/3888
(Continued)

FOREIGN PATENT DOCUMENTS

| CN | 202856831 | 4/2013 |
| TW | 418331 | 12/2011 |
| TW | 201414263 | 4/2014 |

OTHER PUBLICATIONS

"Office Action of Taiwan Counterpart Application", dated Mar. 5, 2020, p. 1-p. 8.

*Primary Examiner* — Liton Miah
(74) *Attorney, Agent, or Firm* — JCIPRNET (57) ABSTRACT

A communication signal transform device and a communication signal transform method are provided. The communication signal transform method includes: disposing the mobile device detachably in a case having an exposed portion, and exposing a display of the mobile device from the case through the exposed portion; and generating an output signal supported by the mobile device in response to a signal received from an external telephone line, and transmitting the output signal to the mobile device.

17 Claims, 6 Drawing Sheets

(51) Int. Cl.
*G06F 1/16* (2006.01)
*H04M 1/72409* (2021.01)

(58) Field of Classification Search
CPC ........... H04M 1/725; H04M 2207/203; H04M 1/6016; H04M 1/72; H04W 76/10; H04W 84/14; H04W 88/02
See application file for complete search history.

(56) References Cited

U.S. PATENT DOCUMENTS

| | | | |
|---|---|---|---|
| 9,571,148 B2* | 2/2017 | Olson | G08C 17/02 |
| 2003/0078948 A1* | 4/2003 | Otsuka | G06F 11/1456 |
| 2006/0111151 A1* | 5/2006 | Lie | H04M 1/72 455/565 |
| 2014/0128131 A1* | 5/2014 | Sin | H04B 1/3888 455/575.8 |
| 2015/0065208 A1* | 3/2015 | Balaji | A45C 11/00 455/575.8 |
| 2018/0241868 A1* | 8/2018 | Mahalingam | H04M 1/72527 |

* cited by examiner

FIG. 7

COMMUNICATION SIGNAL TRANSFORM DEVICE AND COMMUNICATION SIGNAL TRANSFORM METHOD

CROSS-REFERENCE TO RELATED APPLICATION

This application claims the priority benefits of U.S. provisional application Ser. No. 62/674,569, filed on May 21, 2018. The entirety of the above-mentioned patent application is hereby incorporated by reference herein and made a part of specification.

TECHNICAL FIELD

The invention relates to a communication signal transform device and a communication signal transform method.

BACKGROUND

With advancements in technologies, mobile devices such as mobile phones or tablets computer have been commonly used. The number of indoor landline telephones is gradually decreasing as almost everyone holds a mobile phone nowadays. Moreover, many homes no longer have the landline telephones installed. However, the landline telephones still have many advantages that cannot be replaced by the existing mobile phones. For instance, the call cost of the landline telephone is much lower than that of the mobile phone.

On the other hand, due to the increasingly fierce market competition, the product life cycle of the mobile devices is getting shorter. Users who frequently change the mobile devices often have many mobile devices that are not yet damaged but are idle.

SUMMARY

Accordingly, the invention provides a communication signal transform device and a communication signal transform method, which are adapted for transforming a mobile device into a landline telephone.

The communication signal transform device of the invention includes a case and a motherboard. The case is configured to accommodate a mobile device such that the mobile device is detachably disposed in a case having an exposed portion and a display of the mobile device is exposed from the case through the exposed portion. The motherboard includes a telephone plug, a first transceiver, a first processor and a signal transformation chip. The telephone plug is configured to be coupled to an external telephone line. The first transceiver is communicatively coupled to the mobile device. The first processor is coupled to the first transceiver. The signal transformation chip is coupled to the first processor and the telephone plug, and the signal transformation chip generates an output signal supported by the mobile device in response to a signal received from the external telephone line. The first processor transmits the output signal to the mobile device through the first transceiver.

In an embodiment of the invention, the signal transformation chip transforms an input signal from the mobile device into a dual tone multi frequency output signal to transmit the dual tone multi frequency output signal to the external telephone line, and transforms the signal from the external telephone line into the output signal to transmit the output signal to the mobile device. The output signal is one of a digital voice signal and a control command.

In an embodiment of the invention, the communication signal transform device further includes a telephone handset. The telephone handset includes a second transceiver, a microphone, a speaker and a second processor. The second transceiver is communicatively coupled to the first transceiver. The microphone receives a first voice signal. The speaker plays a second voice signal. The second processor is coupled to the second transceiver, the microphone and the speaker. The second processor transmits the first voice signal to the first transceiver through the second transceiver, and receives the second voice signal from the first transceiver through the second transceiver.

In an embodiment of the invention, a first electromagnetic switch is disposed on the case. The first electromagnetic switch is coupled to the first processor; the second electromagnetic switch is disposed on a housing of the telephone handset; and the first processor determines that the telephone handset is on-hook in response to the first magnetic switch magnetically coupled to the second magnetic switch, and the first processor determines that the telephone handset is off-hook in response to the first magnetic switch not magnetically coupled to the second magnetic switch.

In an embodiment of the invention, the first processor instructs the mobile device through the first transceiver to execute at least one of starting up, displaying a dial pad, displaying an address book, and displaying a web browser page in response to determining that the telephone handset is off-hook.

In an embodiment of the invention, the first processor instructs the mobile device through the first transceiver to enter a standby mode in response to determining that the telephone handset is on-hook.

In an embodiment of the invention, the communication signal transform device further includes: a third electromagnetic switch, disposed on the case and coupled to the first processor; and a cover, connected to the case and disposed with a fourth electromagnetic switch. The first processor determines that the cover covers on the exposed portion in response to the third magnetic switch magnetically coupled to the fourth magnetic switch, and the first processor determines that the cover is opened in response to the third magnetic switch not magnetically coupled to the fourth magnetic switch.

In an embodiment of the invention, the first processor instructs the mobile device through the first transceiver to execute at least one of starting up, displaying a dial pad, executing a memo application, executing a photo album application, displaying an address book, displaying a news page, and displaying a web browser page in response to determining that the cover is opened.

In an embodiment of the invention, a plurality of holes is disposed on the cover such that the cover exposes a portion of the display of the mobile device when covering on the exposed portion.

In an embodiment of the invention, the first processor instructs the mobile device through the first transceiver to display a dial pad in response to determining that the cover covers on the exposed portion. Numbers and symbols on the dial pad are exposed through the holes on the cover.

In an embodiment of the invention, the control command instructs the mobile device to display a call ID corresponding to the signal.

In an embodiment of the invention, the case further includes: a second transceiver, communicatively coupled to the first transceiver; a microphone, receiving a first voice signal; a speaker, playing a second voice signal; and a second processor, coupled to the second transceiver, the microphone and the speaker. The second processor transmits the first voice signal to the first transceiver through the second transceiver, and receives the second voice signal from the first transceiver through the second transceiver.

The communication signal transform method of the invention includes: disposing the mobile device detachably in a case having an exposed portion, and exposing a display of the mobile device from the case through the exposed portion; and generating an output signal supported by the mobile device in response to a signal received from an external telephone line, and transmitting the output signal to the mobile device.

In an embodiment of the invention, the communication signal transform method further includes: transforming an input signal from the mobile device into a dual tone multi frequency output signal to transmit the dual tone multi frequency output signal to the external telephone line; and transforming the signal from the external telephone line into the output signal to transmit the output signal to the mobile device, wherein the output signal is one of a digital voice signal and a control command.

In an embodiment of the invention, a first electromagnetic switch is disposed on the case, and a second electromagnetic switch is disposed on a housing of a telephone handset that fits the case, wherein the communication signal transform method further includes: determining that the telephone handset is on-hook in response to the first magnetic switch magnetically coupled to the second magnetic switch; and determining that the telephone handset is off-hook in response to the first magnetic switch not magnetically coupled to the second magnetic switch.

In an embodiment of the invention, the communication signal transform method further includes: instructing the mobile device to execute at least one of starting up, displaying a dial pad, displaying an address book, and displaying a web browser page in response to determining that the telephone handset is off-hook.

In an embodiment of the invention, the communication signal transform method further includes: instructing the mobile device to enter a standby mode in response to determining that the telephone handset is on-hook.

In an embodiment of the invention, the communication signal transform method further includes: disposing a third electromagnetic switch on the case; connecting a cover disposed with a fourth magnetic switch to the case; determining that the cover covers on the exposed portion in response to the third magnetic switch magnetically coupled to the fourth magnetic switch; and determining that the cover is opened in response to the third magnetic switch not magnetically coupled to the fourth magnetic switch.

In an embodiment of the invention, the communication signal transform method further includes: instructing the mobile device to execute at least one of starting up, displaying a dial pad, executing a memo application, executing a photo album application, displaying an address book, displaying a news page, and displaying a web browser page in response to determining that the cover is opened.

In an embodiment of the invention, the communication signal transform method further includes: disposing a plurality of holes on the cover such that the cover exposes a portion of the display of the mobile device when covering on the exposed portion.

In an embodiment of the invention, the communication signal transform method further includes: instructing the mobile device to display a dial pad in response to determining that the cover covers the exposed portion, wherein numbers and symbols on the dial pad are exposed through the holes on the cover.

In an embodiment of the invention, the control command instructs the mobile device to display a call ID corresponding to the signal.

In an embodiment of the invention, the communication signal transform method further includes: receiving a first voice signal by using a microphone on the case; transforming the first voice signal into a dual tone multi frequency output signal, and transmitting the dual tone multi frequency output signal to the external telephone line; transforming the signal from the external telephone line into a second voice signal, wherein the signal is a dual tone multi frequency input signal; and playing the second voice signal by using a speaker on the case.

Based on the above, the communication signal transform device of the invention can transform the idle mobile device into the landline phone so that the idle mobile device may be reused effectively.

To make the above features and advantages of the disclosure more comprehensible, several embodiments accompanied with drawings are described in detail as follows.

DETAILED DESCRIPTION

In order to make content of the invention more comprehensible, embodiments are described below as the examples to prove that the invention can actually be realized. Moreover, elements/components/steps with same reference numerals represent same or similar parts in the drawings and embodiments.

Figure 1:
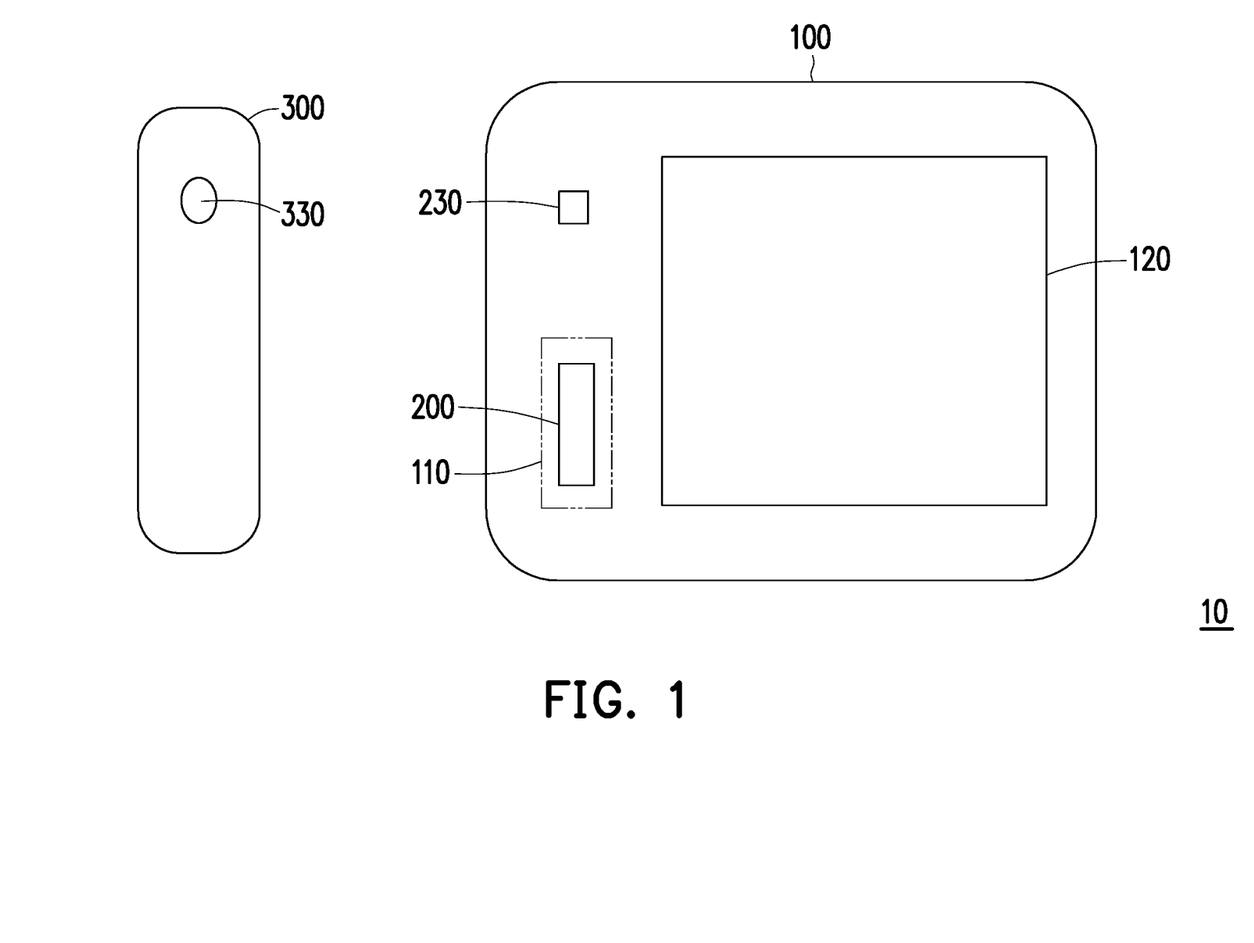
FIG. 1 illustrates a schematic diagram of a communication signal transform device according to an embodiment of the invention.

FIG. 1 illustrates a schematic diagram of a communication signal transform device 10 according to an embodiment of the invention. The communication signal transform device 10 can execute functions such as transforming a mobile device into a landline telephone. Here, the mobile device is, for example, an electronic device having a display, such as a smart phone or a tablet computer. In the following embodiment, the display of the mobile device is a touch display, but the invention is not limited thereto.

With reference to FIG. 1, the communication signal transform device 10 includes a case 100 and a motherboard 200. The case 100 includes a preset space 110 and an exposed portion 120. The motherboard 200 may be disposed in the preset space 110 of the case 100, but the invention is not limited thereto. When the mobile device is detachably disposed in the case 100, the display of the mobile device is exposed from the case 100 through the exposed portion 120. Since the display of the mobile device is the touch display, the user can touch on the touch display of the mobile device through the exposed portion 120 to operate the mobile device disposed in the case 100. The motherboard 200 is, for example, a printed circuit board (PCB).

Figure 2:
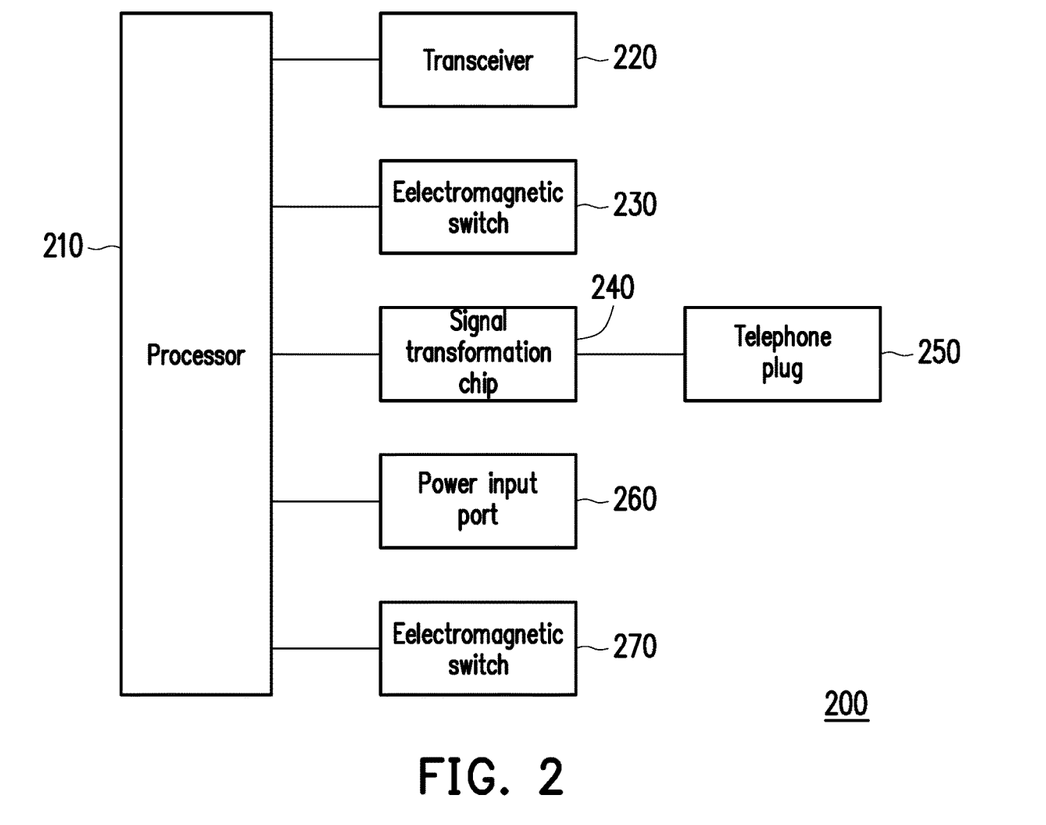
FIG. 2 illustrates a function block diagram of the motherboard of the communication signal transform device according to an embodiment of the invention.

FIG. 2 illustrates a function block diagram of the motherboard 200 of the communication signal transform device 10 according to an embodiment of the invention. With reference to FIG. 2, the motherboard 200 includes a processor 210, a transceiver 220, a signal transformation chip 240, a telephone plug 250 and a power input port 260. The processor 210 is configured to implement functions of the communication signal transform device 10. The processor 210 is, for example, a central processing unit (CPU) or other programmable micro control units (MCU) for general purpose or special purpose such as a microprocessor, a digital signal processor (DSP), a programmable controller, an application specific integrated circuit (ASIC), a graphics processing unit (GPU), an arithmetic logic unit (ALU), other similar elements or a combination of above-mentioned elements, but the invention is not limited thereto.

The transceiver 220 is coupled to the processor 210. The transceiver 220 is configured to be communicatively coupled to the mobile device disposed in the case 100 by using one of a plurality of communication protocols. Here, the communication protocols include Bluetooth or Wi-Fi, but the invention is not limited thereto. For instance, the transceiver 220 may also be connected to the mobile device through physical lines and communicated with the mobile device by using communication protocols such as universal serial bus (USB) or lightning.

The signal transformation chip 240 is coupled to the processor 210 and the telephone plug 250. Here, the telephone plug 250 is configured to couple to an external telephone line. The signal transformation chip 240 generates an output signal supported by the mobile device in response to a signal received from the external telephone line. The processor 210 can transmit the output signal to the mobile device through the transceiver 220. For instance, the signal transformation chip 240 can transform an analog voice signal from the external telephone line into a digital voice signal. The processor 210 can transmit the digital voice signal to the mobile device through the transceiver 220 so the mobile device can communicate with an external telephone on the other side the external telephone line through the external telephone line. As another example, the signal transformation chip 240 can transform the signal from the external telephone line into a control command. The processor 210 can transmit the control command to the mobile device through the transceiver 220 to instruct the mobile device to display a call ID corresponding to the signal from the external telephone line.

Figure 3A:
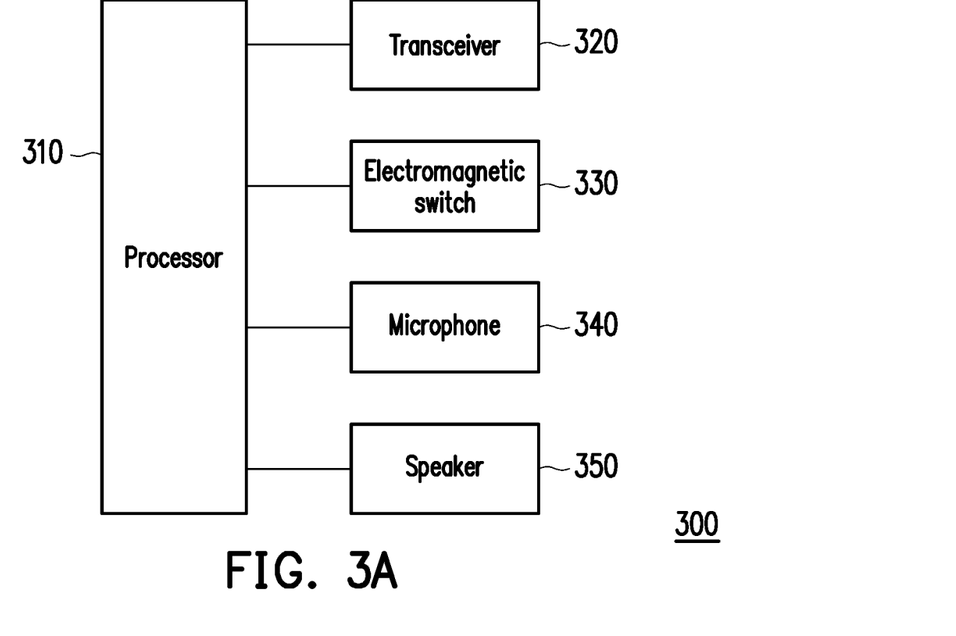
FIG. 3A illustrates a function block diagram of the telephone handset of the communication signal transform device according to an embodiment of the invention.

On the other hand, the processor 210 can receive an input signal from the mobile device through the transceiver 220. The signal transformation chip 240 can transform the input signal from the mobile device into a dual tone multi frequency output signal to transmit the dual tone multi frequency output signal to the external telephone line coupled to the telephone plug 250. Here, the input signal is a digital signal that can be supported by the mobile device (e.g., a dial signal generated by the mobile device), and the dual tone multi frequency output signal is an analog signal that can be supported by the traditional landline telephone. With reference to FIG. 1, in certain embodiments, the communication signal transform device 10 further includes a telephone handset 300. FIG. 3A illustrates a function block diagram of the telephone handset 300 of the communication signal transform device 10 according to an embodiment of the invention. With reference to FIG. 3A, the motherboard 300 includes a processor 310, a transceiver 320, an electromagnetic switch 330, a microphone 340 and a speaker 350.

The processor 310 is coupled to the transceiver 320, the microphone 340 and the speaker 320. The transceiver 320 is configured to be communicatively coupled to the transceiver 220. The processor 310 is configured to implement functions of the telephone handset 300 of the communication signal transform device 10. Specifically, when the processor 310 is communicatively coupled to the transceiver 220 through the transceiver 320, voice signals can be transmitted between the processor 310 and the processor 210. For instance, the microphone 340 can receive a first voice signal. Here, the first voice signal is, for example, a sound made by the user. The processor 310 can transmit the first voice signal to the transceiver 220 through the transceiver 320. The first voice signal is transmitted to the external telephone line via the signal transformation chip 240.

On the other hand, after the signal transformation chip 240 receives a second voice signal from the external telephone line through the telephone plug, the signal transformation chip 240 can forward the second voice signal to the processor 210. The processor 210 can transmit the second voice signal to the telephone handset 300 through the transceiver 220. The telephone handset 300 can play the second voice signal through the speaker 350.

In certain embodiments, the processor 310 is coupled to the electromagnetic switch 330. The processor 310 can determine whether the telephone handset 300 is on-hook or off-hook according to whether the electromagnetic switch 330 is magnetically coupled to the other electromagnetic switch. The processor 310 enters a standby mode in response to the electromagnetic switch 330 magnetically coupled to magnetically coupled to the other electromagnetic switch, and starts up in response to the electromagnetic switch 330 not magnetically coupled to the other electromagnetic switch.

The processor 310 is, for example, a central processing unit or other programmable micro control units for general purpose or special purpose such as a microprocessor, a digital signal processor, a programmable controller, an application specific integrated circuit, a graphics processing unit, an arithmetic logic unit, other similar elements or a combination of above-mentioned elements, but the invention is not limited thereto.

The transceiver 320 is coupled to the processor 310. The transceiver 320 is configured to be communicatively coupled to the transceiver 220 by using one of a plurality of communication protocols. Here, the communication protocols include Bluetooth or Wi-Fi, but the invention is not limited thereto. For instance, the transceiver 320 may also be connected to the transceiver 220 through physical lines and communicated with the transceiver 220 by using communication protocols such as universal serial bus or lightning.

Table 1 is a lookup table for transformation between a digital signal and a dual tone multi frequency signal. The signal transformation chip 240 can store the lookup table and transform the input signal (e.g., the dial signal) from the mobile device into the dual tone multi frequency output signal according to the lookup table. For instance, after the signal transformation chip 240 receives a digital signal "0001" representing "the number 1" from the mobile device, the signal transformation chip 240 can transform the digital signal "0001" representing "the number 1" into a dual tone multi frequency output signal with low frequency "697 Hz" and high frequency "1209 Hz", and then transmit said dual tone multi frequency output signal to the external telephone line through the telephone plug 250. A telephone switch on the other side of the external telephone line can receive the dual tone multi frequency output signal and determine that the number dialed by the user from the mobile device is "the number 1" according to the dual tone multi frequency output signal.

TABLE 1

| Numbers and symbols | Digital signal | | | | Dual tone multi frequency signal | |
|---|---|---|---|---|---|---|
| | Bit 3 | Bit 2 | Bit 1 | Bit 0 | Low frequency (Hz) | High frequency (Hz) |
| 1 | 0 | 0 | 0 | 1 | 697 | 1209 |
| 2 | 0 | 0 | 1 | 0 | 697 | 1336 |
| 3 | 0 | 0 | 1 | 1 | 697 | 1477 |
| 4 | 0 | 1 | 0 | 0 | 770 | 1209 |
| 5 | 0 | 1 | 0 | 1 | 770 | 1336 |
| 6 | 0 | 1 | 1 | 0 | 770 | 1477 |
| 7 | 0 | 1 | 1 | 1 | 852 | 1209 |
| 8 | 1 | 0 | 0 | 0 | 852 | 1336 |
| 9 | 1 | 0 | 0 | 1 | 852 | 1477 |
| 0 | 1 | 0 | 1 | 0 | 941 | 1336 |
| * | 1 | 0 | 1 | 1 | 941 | 1209 |
| # | 1 | 1 | 0 | 0 | 941 | 1477 |

The power input port 260 is coupled to a power source. The power input port 260 is configured to supply the communication signal transform device 10 electric energy. In certain embodiments, the communication signal transform device 10 can supply electric energy to the mobile device disposed in the case 100 in a wired or wireless manner.

Figure 3B:
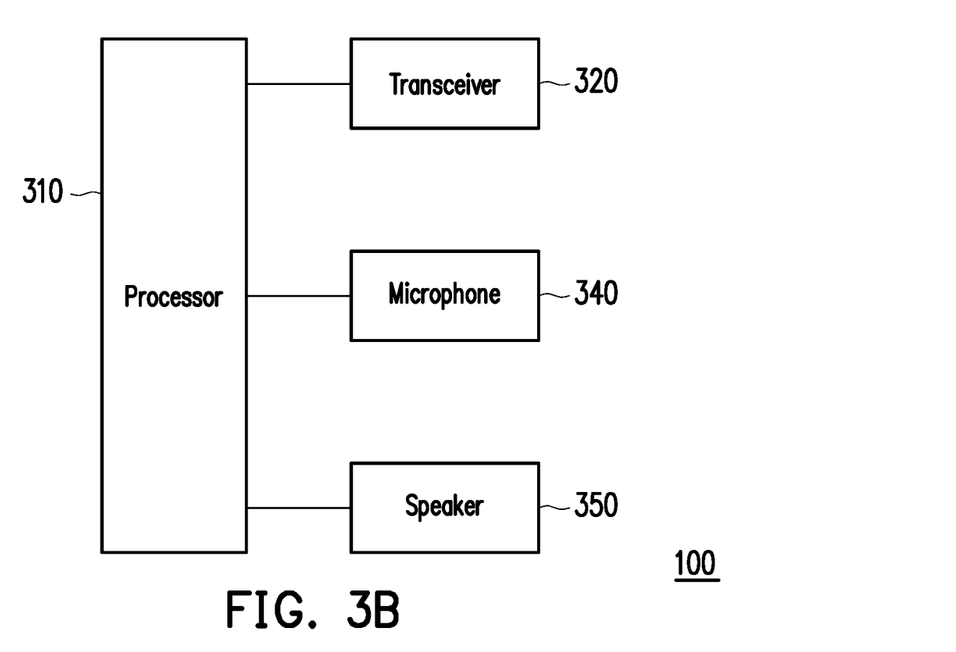
FIG. 3B illustrates a function block diagram of the modified case of the telephone handset according to an embodiment of the invention.

In certain embodiments, it also possible that the communication signal transform device 10 does not include telephone handset 300. Functions of the telephone handset 300 may be replaced by the case 100 being modified. FIG. 3B illustrates a function block diagram of the modified case 100 of the telephone handset according to an embodiment of the invention. The modified case 100 may include the processor 310 as well as the transceiver 320, the microphone 340 and the speaker 350 coupled to the processor 310.

With reference to FIG. 1 and FIG. 3A, in certain embodiments, an electromagnetic switch 230 coupled to the processor 210 is disposed on the case 100. The telephone handset 300 can be fixed onto the case 100 by magnetically coupling the electromagnetic switch 330 to the electromagnetic switch 230. The processor 210 can determine whether the telephone handset 300 is on-hook or off-hook according to whether the electromagnetic switch 230 and the electromagnetic switch 330 are magnetically coupled. Specifically, the processor 210 determines that the telephone handset 300 is on-hook in response to the electromagnetic switch 230 magnetically coupled to the electromagnetic switch 330, and the processor 210 determines that the telephone handset 300 is off-hook in response to the electromagnetic switch 230 not magnetically coupled to the electromagnetic switch 330.

The processor 210 can instruct the mobile device disposed in the case 100 through the transceiver 220 to execute multiple functions in response to the telephone handset 300 being off-hook. For instance, the processor 210 can instruct the mobile device in the standby mode or a sleep mode to start up or wake up after determining that the telephone handset 300 is off-hook. On the other hand, the processor 210 can instruct the mobile device to enter the standby mode or the sleep mode after determining that the telephone handset 300 is on-hook so as to save energy.

In certain embodiments, the processor 220 can determine that the user is about to make a phone call in response to the telephone handset 300 being off-hook. In such case, the processor 210 can instruct the mobile device through the transceiver 220 to display a dial pad on the display for the user to dial a telephone number. The processor 210 can also instruct the mobile device through the transceiver 220 to display an address book so the user can dial the telephone number more conveniently. Optionally, contact's avatars may be used on the address book. The address book can be combined with the functionality of an album application. For instance, the user can use photos in the album application to set the contact's avatars on the address book.

In certain embodiments, the processor 210 can instruct the mobile device through the transceiver 220 to display a web browser page in response to the telephone handset 300 being off-hook. The mobile device can automatically dial the telephone number in response to the telephone number on the web browser page being tapped by the user.

Figure 4:
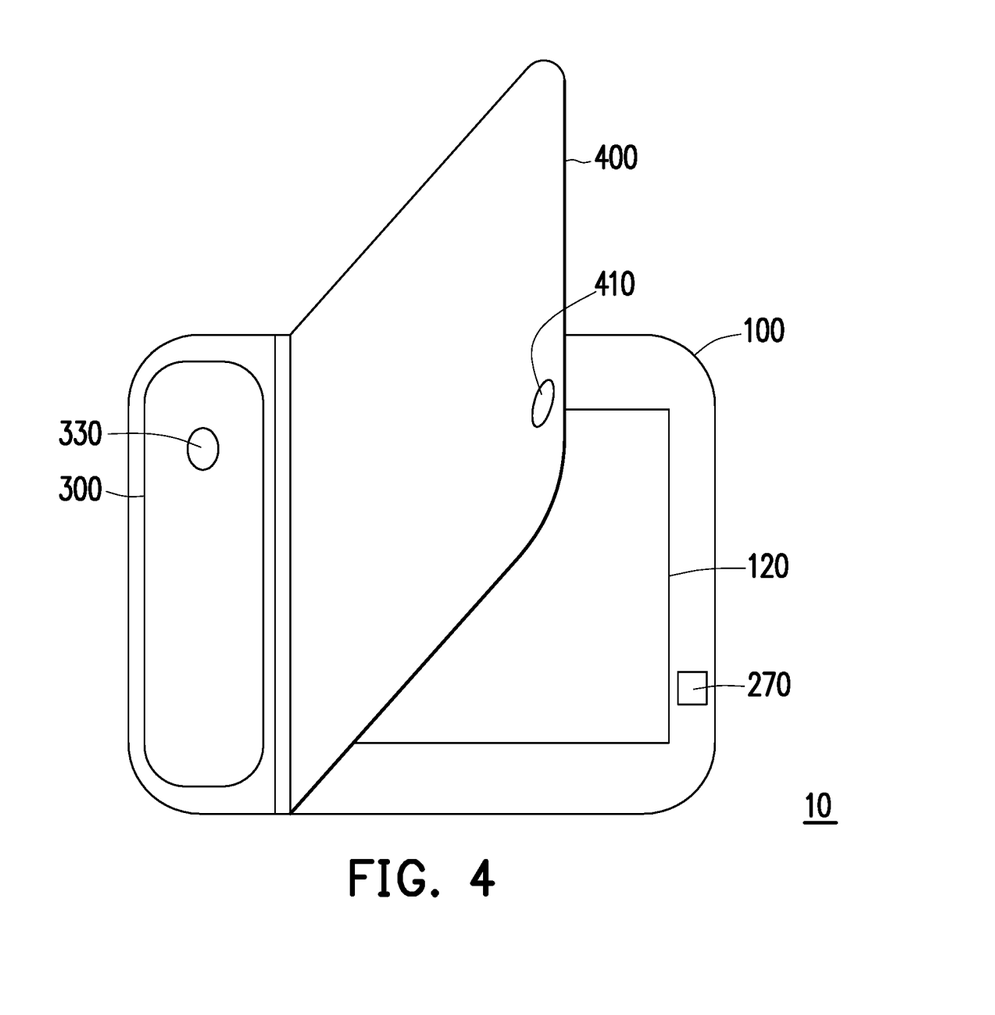
FIG. 4 illustrates a schematic diagram of the communication signal transform device with a cover opened according to an embodiment of the invention.
Figure 5:
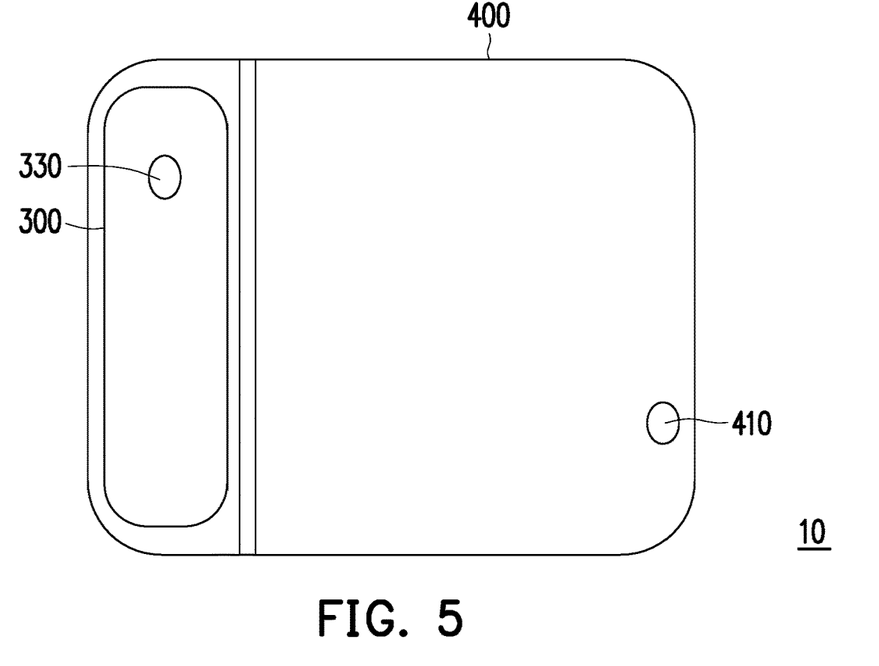
FIG. 5 illustrates a schematic diagram of the communication signal transform device with the cover covering on the exposed portion of the case according to an embodiment of the invention.

FIG. 4 illustrates a schematic diagram of the communication signal transform device 10 with a cover 400 opened according to an embodiment of the invention. FIG. 5 illustrates a schematic diagram of the communication signal transform device 10 with the cover 400 covering on the exposed portion 120 of the case 100 according to an embodiment of the invention. With reference to FIG. 4 and FIG. 5, in certain embodiments, the communication signal transform device 10 further includes the cover 400, and an electromagnetic switch 270 coupled to the processor 210 is disposed on the case 100 (as shown by FIG. 2). The cover 400 is connected to the case 100 and disposed with an electromagnetic switch 410. The processor 210 can determine whether the cover 400 is opened according to whether the electromagnetic switch 270 and the electromagnetic switch 410 are magnetically coupled. Specifically, the processor 210 determines that the cover 4000 covers on the exposed portion 120 of the exposed portion 120 of the case 100 in response to the electromagnetic switch 270 magnetically coupled to the electromagnetic switch 410, as shown by FIG. 5. On the other hand, the processor 210 determines that the cover 400 is opened in response to the electromagnetic switch 270 not magnetically coupled to the electromagnetic switch 410, as shown by FIG. 4.

The processor 210 can instruct the mobile device disposed in the case 100 through the transceiver 220 to execute multiple functions in response to determining that the cover 400 is opened. For instance, the processor 210 can instruct the mobile device through the transceiver 220 to start up and display the dial pad after determining that the cover 400 is opened. As another example, the processor 210 can instruct the mobile device through the transceiver 220 to execute a memo application for the user to record the conversation after determining that the cover 400 is opened Alternatively, the processor 210 can instruct the mobile device through the transceiver 220 to display a news page after determining that the cover 400 is opened.

In certain embodiments, the processor 210 can instruct the mobile device through the transceiver 220 to display an address book in response to the cover 400 being opened so the user can dial the telephone number more conveniently. Optionally, contact's avatars may be used on the address book. The address book can be combined with the functionality of an album application. For instance, the user can use photos in the album application to set the contact's avatars on the address book.

In certain embodiments, the processor 210 can instruct the mobile device through the transceiver 220 to display a web browser page in response to the cover 400 being opened. The mobile device can automatically dial the telephone number in response to the telephone number on the web browser page being tapped by the user.

Figure 6:
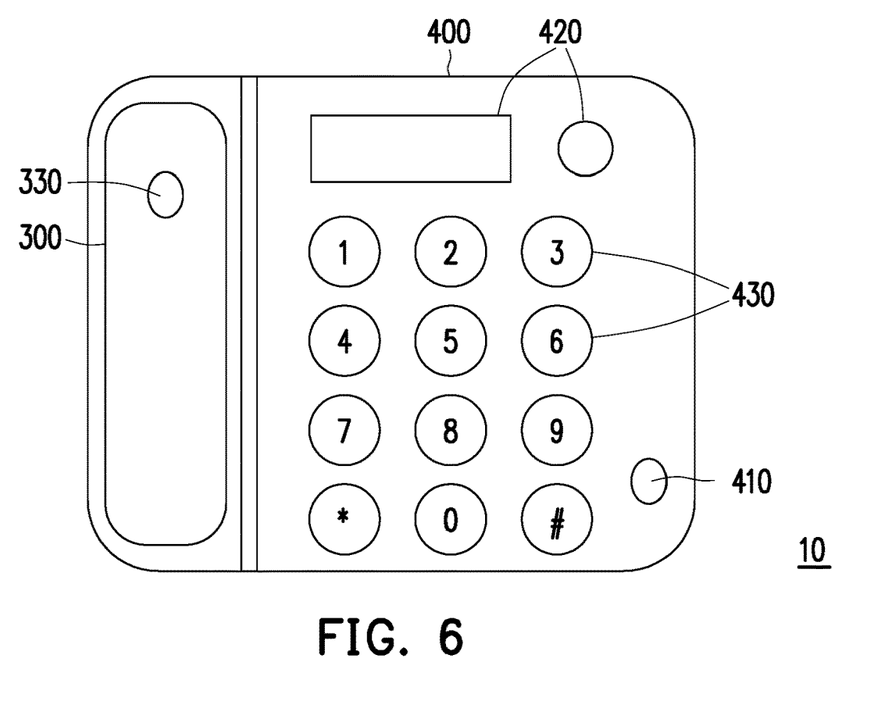
FIG. 6 illustrates a schematic diagram of the communication signal transform device with the cover having a plurality of holes according to an embodiment of the invention.

FIG. 6 illustrates a schematic diagram of the communication signal transform device 10 with the cover 400 having a plurality of holes 420 and 430 according to an embodiment of the invention. With reference to FIG. 6, in certain embodiments, the holes 420 or 430 are disposed on the cover 400. When the cover 400 covers on the exposed portion 120 of the case 100, the mobile device disposed in the case 100 can expose a portion of the display from the case 100 through the holes 420 or the holes 430. Accordingly, images in the portion of the display may be exposed through the holes 420 or the holes 430. Here, the images include, for example, the dial pad, the address book, the contact or functions buttons on the landline telephone (e.g., a redial button, a missed-call-inquiry button, a speaker button, a hold button or a transfer button, but the invention is not limited thereto). For instance, the processor 210 can instruct the mobile device through the transceiver 220 to display the dial pad in response to determining that the cover 400 covers on the exposed portion 120. Here, numbers and symbols on the dial pad are exposed through the holes 430 on the cover 400. The user can dial the telephone number by touching the dial pad displayed by the mobile device through the holes 430.

Figure 7:
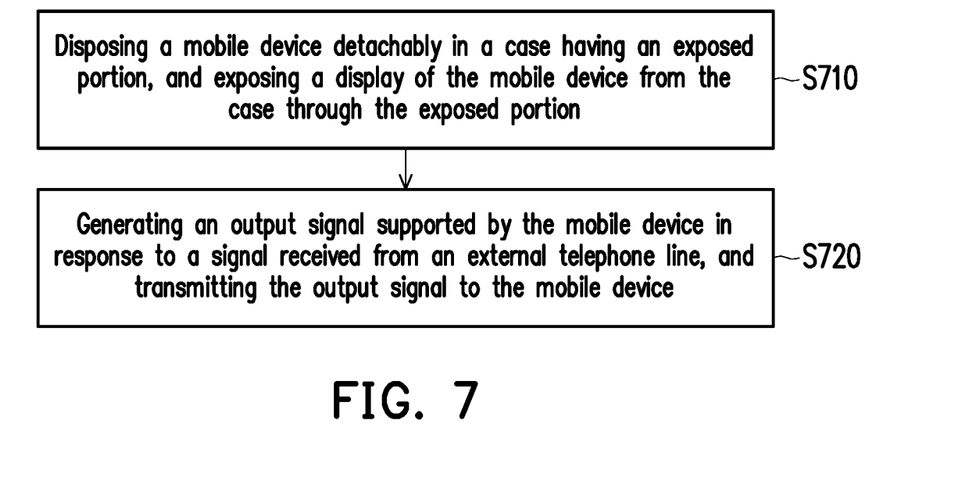
FIG. 7 illustrates a schematic diagram of a communication signal transform method according to an embodiment of the invention.

FIG. 7 illustrates a schematic diagram of a communication signal transform method according to an embodiment of the invention. The communication signal transform method is adapted for transforming a mobile device into a landline telephone, and the communication signal transform method may be implemented by the communication signal transform device 10. In step S710, the mobile device is detachably disposed in a case having an exposed portion, and a display of the mobile device is exposed from the case through the exposed portion. In step S720, an output signal supported by the mobile device is generated in response to a signal received from an external telephone line, and the output signal is transmitted to the mobile device.

In summary, the communication signal transform device of the invention can transform the idle mobile device into the landline phone. Simply by disposing the mobile device in the communication signal transform device, the communication signal transform device can generate the dial pad by using the display of the mobile device and allow the telephone handset to be communicatively coupled to the mobile device. In this way, the user can achieve a user experience similar to that of using the landline telephone through the telephone handset and the dial pad. On other hand, the mobile device connected with the communication signal transform device can provide more functions than the functions of the traditional landline telephone, and the idle mobile phone may be reused effectively.

No element, act, or instruction used in the detailed description of disclosed embodiments of the invention should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items", individually or in conjunction with other items and/or other categories of items. Further, as used herein, the term "set" is intended to include any number of items, including zero. Further, as used herein, the term "number" is intended to include any number, including zero.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A communication signal transform device, comprising:
a case, configured to accommodate a mobile device such that the mobile device is detachably disposed in a case having an exposed portion and a display of the mobile device is exposed from the case through the exposed portion;
a motherboard, the motherboard comprising:
a telephone plug, configured to be coupled to an external telephone line;
a first transceiver, communicatively coupled to the mobile device;
a first processor, coupled to the first transceiver; and
a signal transformation chip, coupled to the first processor and the telephone plug, the signal transformation chip generating an output signal supported by the mobile device in response to a signal received from the external telephone line, wherein the first processor transmits the output signal to the mobile device through the first transceiver; and
a telephone handset, wherein
a first electromagnetic switch is disposed on the case, wherein the first electromagnetic switch is coupled to the first processor;
a second electromagnetic switch is disposed on a housing of the telephone handset; and
the first processor determines that the telephone handset is on-hook in response to the first electromagnetic switch magnetically coupled to the second electromagnetic switch, and the first processor determines that the telephone handset is off-hook in response to the first electromagnetic switch not magnetically coupled to the second electromagnetic switch, wherein the first processor instructs the mobile device through the first transceiver to execute at least one of starting up, displaying a dial pad, displaying an address book, and displaying a web browser page in response to determining that the telephone handset is off-hook, wherein the first processor instructs the mobile device through the first transceiver to enter a standby mode in response to determining that the telephone handset is on-hook.

2. The communication signal transform device according to claim 1, wherein the signal transformation chip transforms an input signal from the mobile device into a dual tone multi frequency output signal to transmit the dual tone multi frequency output signal to the external telephone line, and transforms the signal from the external telephone line into the output signal to transmit the output signal to the mobile device, wherein the output signal is one of a digital voice signal and a control command.

3. The communication signal transform device according to claim 2, wherein the control command instructs the mobile device to display a call ID corresponding to the signal.

4. The communication signal transform device according to claim 1, wherein
the telephone handset comprises:
a second transceiver, communicatively coupled to the first transceiver;
a microphone, receiving a first voice signal;
a speaker, playing a second voice signal; and
a second processor, coupled to the second transceiver, the microphone and the speaker, wherein the second processor transmits the first voice signal to the first transceiver through the second transceiver, and receives the second voice signal from the first transceiver through the second transceiver.

5. The communication signal transform device according to claim 1, further comprising:
a third electromagnetic switch, disposed on the case and coupled to the first processor; and
a cover, connected to the case and disposed with a fourth electromagnetic switch, wherein the first processor determines that the cover covers on the exposed portion in response to the third electromagnetic switch magnetically coupled to the fourth electromagnetic switch, and the first processor determines that the cover is opened in response to the third electromagnetic switch not magnetically coupled to the fourth electromagnetic switch.

6. The communication signal transform device according to claim 5, wherein the first processor instructs the mobile device through the first transceiver to execute at least one of starting up, displaying a dial pad, executing a memo application, executing a photo album application, displaying an address book, displaying a news page, and displaying a web browser page in response to determining that the cover is opened.

7. The communication signal transform device according to claim 5, wherein a plurality of holes is disposed on the cover such that the cover exposes a portion of the display of the mobile device when covering on the exposed portion.

8. The communication signal transform device according to claim 7, wherein the first processor instructs the mobile device through the first transceiver to display a dial pad in response to determining that the cover covers on the exposed portion, wherein numbers and symbols on the dial pad are exposed through the holes on the cover.

9. The communication signal transform device according to claim 1, wherein the case further comprises:
a second transceiver, communicatively coupled to the first transceiver;
a microphone, receiving a first voice signal;
a speaker, playing a second voice signal; and
a second processor, coupled to the second transceiver, the microphone and the speaker, wherein the second processor transmits the first voice signal to the first transceiver through the second transceiver, and receives the second voice signal from the first transceiver through the second transceiver.

10. A communication signal transform method, adapted for transforming a mobile device into a landline telephone, the communication signal transform method comprising:
disposing the mobile device detachably in a case having an exposed portion, and exposing a display of the mobile device from the case through the exposed portion; and
generating an output signal supported by the mobile device in response to a signal received from an external telephone line, and transmitting the output signal to the mobile device,
wherein a first electromagnetic switch is disposed on the case, and a second electromagnetic switch is disposed on a housing of a telephone handset that fits the case, wherein the communication signal transform method further comprises:
determining that the telephone handset is on-hook in response to the first electromagnetic switch magnetically coupled to the second electromagnetic switch;
determining that the telephone handset is off-hook in response to the first electromagnetic switch not magnetically coupled to the second electromagnetic switch,
instructing the mobile device to execute at least one of starting up, displaying a dial pad, displaying an address book, and displaying a web browser page in response to determining that the telephone handset is off-hook, and
instructing the mobile device to enter a standby mode in response to determining that the telephone handset is on-hook.

11. The communication signal transform method according to claim 10, further comprising:
transforming an input signal from the mobile device into a dual tone multi frequency output signal to transmit the dual tone multi frequency output signal to the external telephone line; and
transforming the signal from the external telephone line into the output signal to transmit the output signal to the mobile device, wherein the output signal is one of a digital voice signal and a control command.

12. The communication signal transform method according to claim 11, wherein the control command instructs the mobile device to display a call ID corresponding to the signal.

13. The communication signal transform method according to claim 10, further comprising:
disposing a third electromagnetic switch on the case;
connecting a cover disposed with a fourth electromagnetic switch to the case;
determining that the cover covers on the exposed portion in response to the third electromagnetic switch magnetically coupled to the fourth electromagnetic switch; and
determining that the cover is opened in response to the third electromagnetic switch not magnetically coupled to the fourth electromagnetic switch.

14. The communication signal transform method according to claim 13, further comprising: instructing the mobile device to execute at least one of starting up, displaying a dial pad, executing a memo application, executing a photo album application, displaying an address book, displaying a news page, and displaying a web browser page in response to determining that the cover is opened.

15. The communication signal transform method according to claim 13, further comprising:

disposing a plurality of holes on the cover such that the cover exposes a portion of the display of the mobile device when covering on the exposed portion.

16. The communication signal transform method according to claim 15, further comprising:
instructing the mobile device to display a dial pad in response to determining that the cover covers the exposed portion, wherein numbers and symbols on the dial pad are exposed through the holes on the cover.

17. The communication signal transform method according to claim 10, further comprising:
receiving a first voice signal by using a microphone on the case;
transforming the first voice signal into a dual tone multi frequency output signal, and transmitting the dual tone multi frequency output signal to the external telephone line;
transforming the signal from the external telephone line into a second voice signal, wherein the signal is a dual tone multi frequency input signal; and
playing the second voice signal by using a speaker on the case.

\* \* \* \* \*